(12) United States Patent
Krupa

(10) Patent No.: US 7,117,893 B1
(45) Date of Patent: Oct. 10, 2006

(54) AUTOMATIC FUEL SHUTOFF

(75) Inventor: Lawrence Krupa, Barrington, IL (US)

(73) Assignee: Lawrence Krupa, North Barrington, IL (US)

( * ) Notice: Subject to any disclaimer, the term of this patent is extended or adjusted under 35 U.S.C. 154(b) by 182 days.

(21) Appl. No.: 10/971,493

(22) Filed: Oct. 22, 2004

Related U.S. Application Data

(60) Provisional application No. 60/514,471, filed on Oct. 24, 2003.

(51) Int. Cl.
*F16K 31/48* (2006.01)

(52) U.S. Cl. .................................. 137/624.11

(58) Field of Classification Search ........... 137/624.11, 137/624.12; 239/70
See application file for complete search history.

(56) References Cited

U.S. PATENT DOCUMENTS

| | | | |
|---|---|---|---|
| 3,803,923 A * | 4/1974 | Hajny | 137/624.12 |
| 3,820,405 A | 6/1974 | Hong | |
| 4,807,664 A * | 2/1989 | Wilson et al. | 137/624.11 |
| 5,094,259 A | 3/1992 | Hsu | |
| 5,551,474 A * | 9/1996 | Chuang et al. | 137/624.11 |
| 5,628,242 A | 5/1997 | Higley | |
| 6,289,792 B1 | 9/2001 | Grando | |
| 6,992,258 B1 * | 1/2006 | Vieira | 200/61.86 |

* cited by examiner

*Primary Examiner*—Kevin Lee

(57) ABSTRACT

An apparatus for use with an outdoor gas grill and a natural gas source. The apparatus allows an individual to have a "backup mechanism" which automatically shuts off the natural gas source after a specified amount of time, should an individual forget to turn it off after using it to cook on an outdoor grill.

4 Claims, 4 Drawing Sheets

AUTOMATIC FUEL SHUTOFF

I. CROSS-REFERENCE TO RELATED APPLICATIONS

Figure 1:
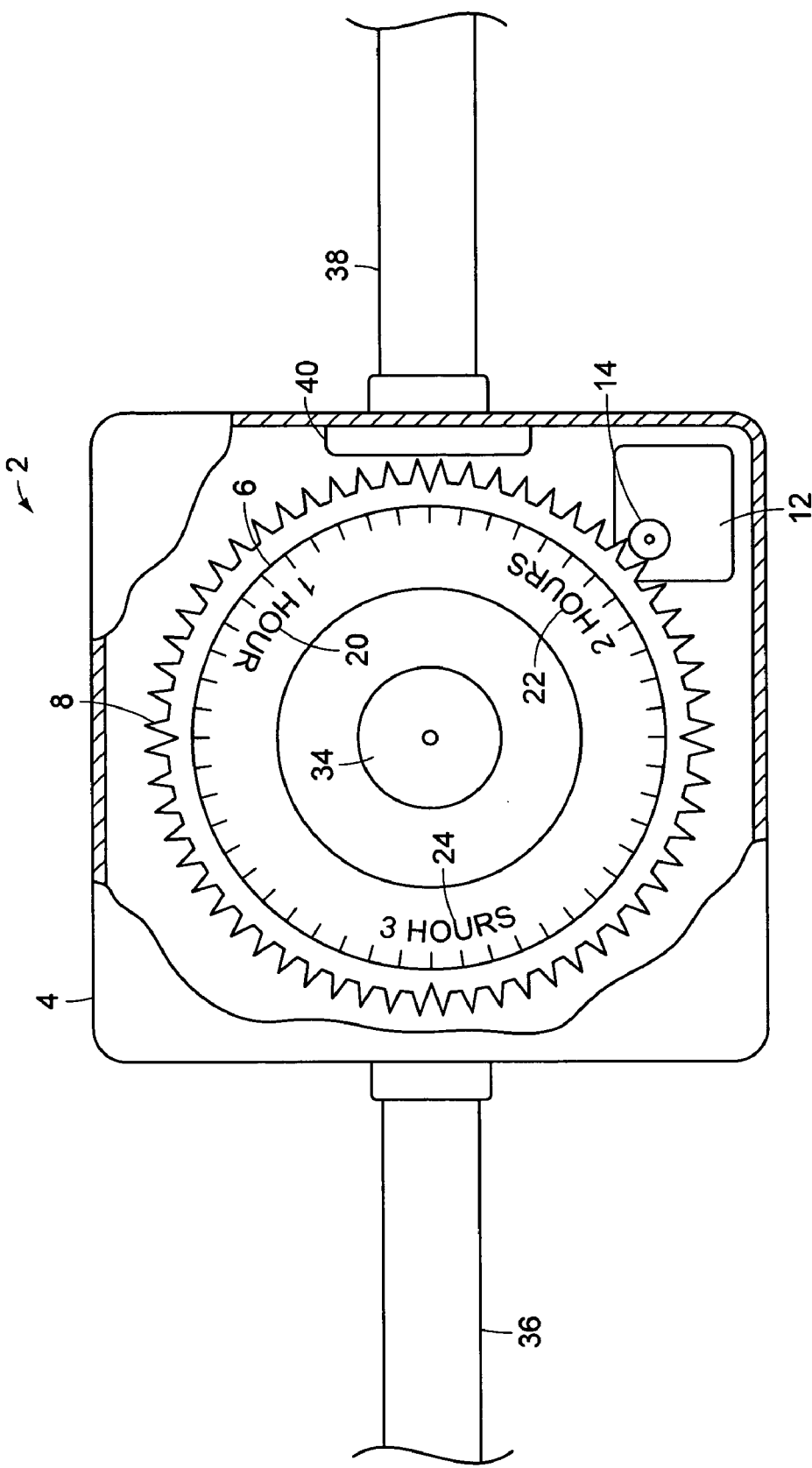

This application claims the benefit of U.S. Provisional Application No. 60/514,471, filed Oct. 24, 2003.

II. BACKGROUND OF THE INVENTION

The present invention concerns that of a new and improved apparatus for use with an outdoor gas grill and a natural gas source.

III. DESCRIPTION OF THE PRIOR ART

U.S. Pat. No. 3,820,405, issued to Hong and U.S. Pat. No. 5,094,259, issued to Hsu, discloses an automatic safety shut-off valve for use with a gas stove.

U.S. Pat. No. 5,628,242, issued to Higley, discloses a gas grill with an automatic shut-off after a pre-determined time, to avoid wasting fuel and causing a fire hazard.

U.S. Pat. No. 6,289,792, issued to Grando, discloses a gas barbecue acting in conjunction with a timer knob and capable of cutting off the flow of fuel after a preset time.

IV. SUMMARY OF THE INVENTION

The present invention concerns that of a new and improved apparatus for use with an outdoor gas grill and a natural gas source. The apparatus allows an individual to have a "backup mechanism" which automatically shuts off the natural gas source after a specified amount of time, should an individual forget to turn it off after using it to cook on an outdoor grill.

There has thus been outlined, rather broadly, the more important features of a timed shut-off apparatus for use with a natural gas source that the detailed description thereof that follows may be better understood and in order that the present contribution to the art may be better appreciated. There are, of course, additional features of the timed shut-off apparatus for use with a natural gas source that will be described hereinafter and which will form the subject matter of the claims appended hereto.

In this respect, before explaining at least one embodiment of the timed shut-off apparatus for use with a natural gas source in detail, it is to be understood that the timed shut-off apparatus for use with a natural gas source is not limited in its application to the details of construction and to the arrangements of the components set forth in the following description or illustrated in the drawings. The timed shut-off apparatus for use with a natural gas source is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present timed shut-off apparatus for use with a natural gas source. It is important, therefore, that the claims be regarded as including such equivalent constructions insofar as they do not depart from the spirit and scope of the present invention.

It is therefore an object of the present invention to provide a timed shut-off apparatus for use with a natural gas source which has all of the advantages of the prior art and none of the disadvantages.

It is another object of the present invention to provide a timed shut-off apparatus for use with a natural gas source which may be easily and efficiently manufactured and marketed.

It is another object of the present invention to provide a timed shut-off apparatus for use with a natural gas source which is of durable and reliable construction.

It is yet another object of the present invention to provide a timed shut-off apparatus for use with a natural gas source which is economically affordable and available for relevant market segment of the purchasing public.

Other objects, features and advantages of the present invention will become more readily apparent from the following detailed description of the preferred embodiment when considered with the attached drawings and appended claims.

V. BRIEF DESCRIPTION OF THE DRAWINGS

Figure 2:
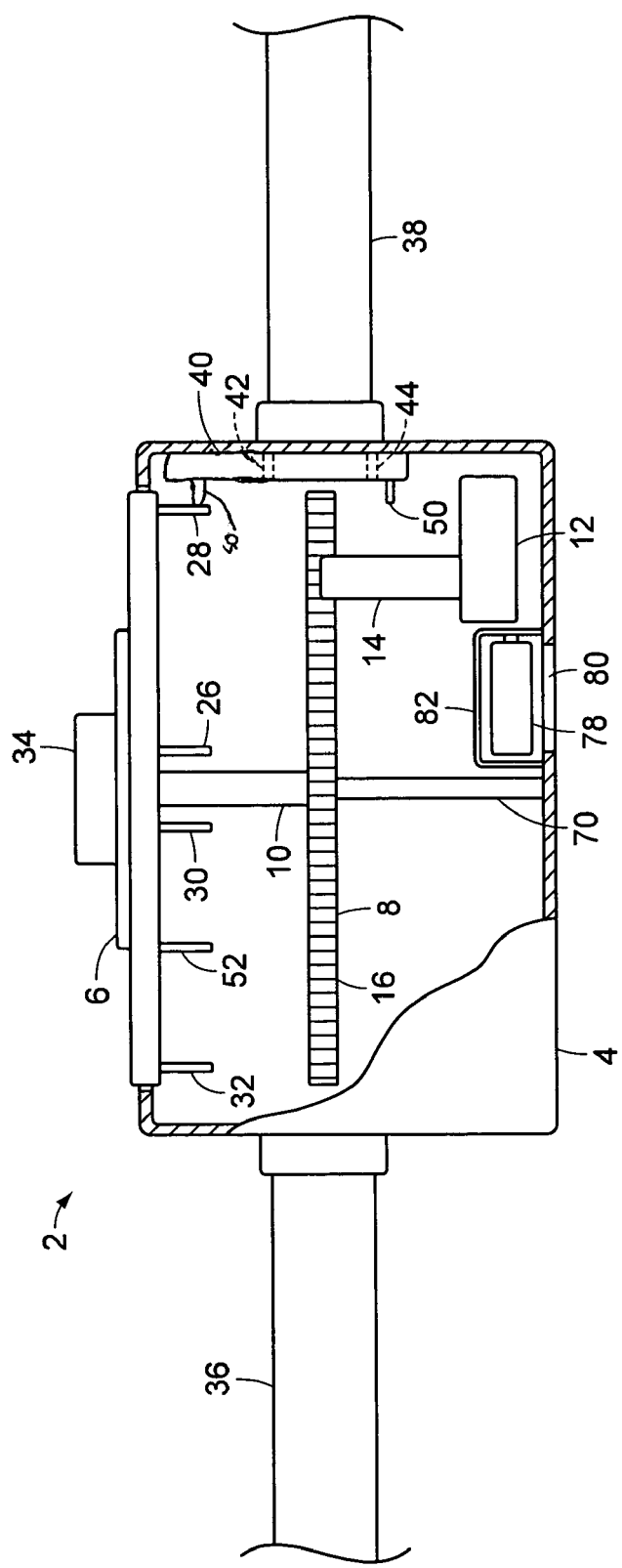
Figure 3A:
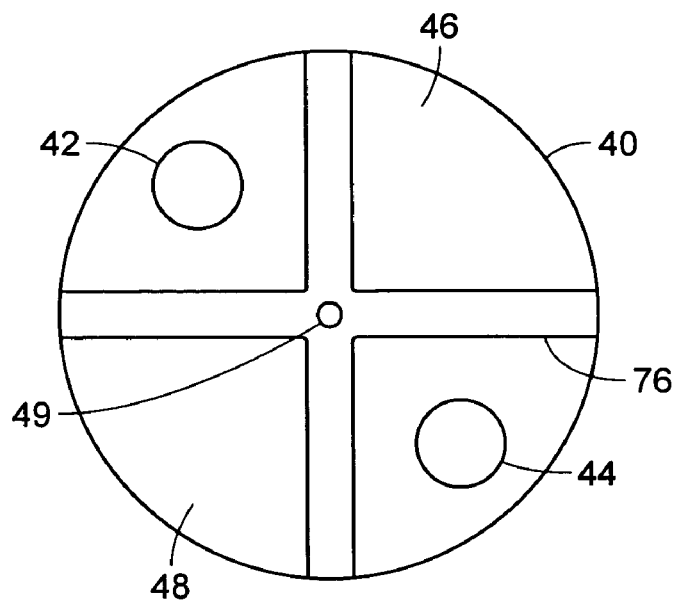
Figure 3B:
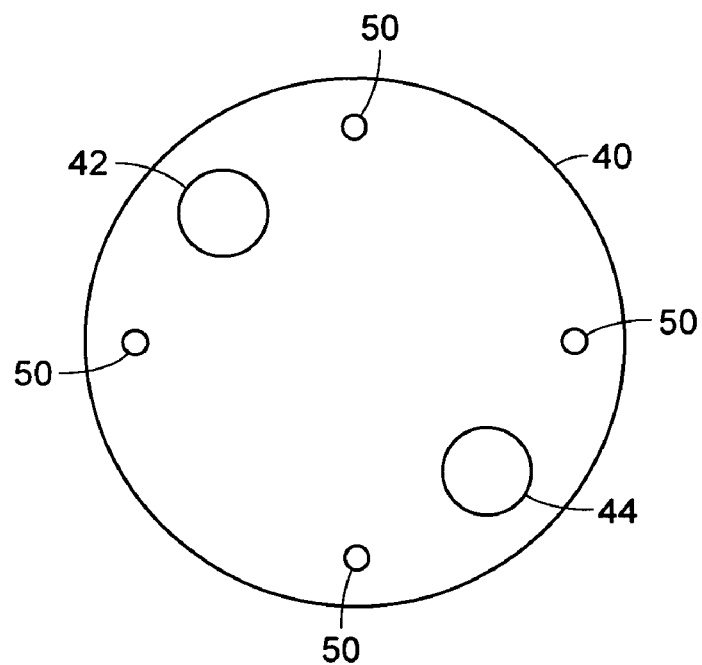
Figure 4:
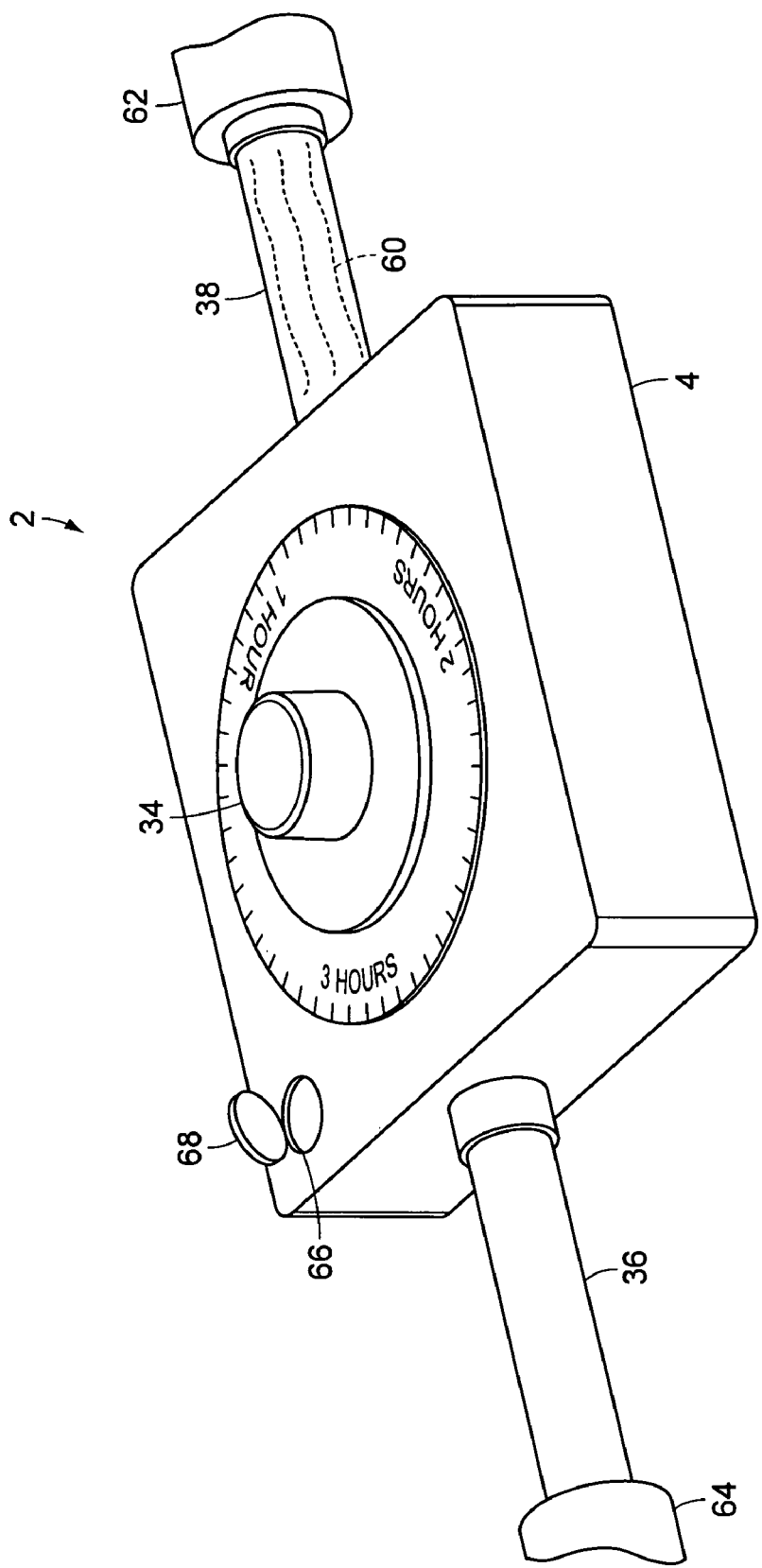

FIG. 1 shows a top cutaway view of the invention.
FIG. 2 shows a side cutaway view of the invention.
FIG. 3A shows a rear view of the shutoff valve.
FIG. 3B shows a front view of the shutoff valve.
FIG. 4 shows a top view of the present invention in use.

VI. DESCRIPTION OF THE PREFERRED EMBODIMENT

FIG. 1 shows a top cutaway view of the invention, while FIG. 2 shows a side cutaway view of the invention. Regulator 2 is designed to be a shutoff mechanism that will allow natural gas to flow to a grill for a limited period of time, after which it will cause the natural gas flow to automatically shut off.

Regulator 2 comprises an outer casing 4, an outer time wheel 6, an inner wheel 8, a connector 10, a timer 12, and a roller wheel 14. Outer casing 4 is a box that has two sides, a first side and a second side, and also has a top surface.

Timer 12 is located within outer casing 4 and accurately keeps track of time. Timer 12 is connected to roller wheel 14 and slowly rotates roller wheel 14, which looks like a cylindrical rod and is vertically placed against inner wheel 8. Roller wheel 14 is toothed and rotation of roller wheel 14 by timer 12 causes inner wheel 8 to rotate also. Inner wheel 8 is centrally mounted within outer casing 4 on mount 70 and has a plurality of teeth 16. The teeth 16 are in contact with roller wheel 14.

Inner wheel 8 has two surfaces, a top surface and a bottom surface. Connector 10 has two ends, a first end and a second end, with the first end of connector 10 being centrally attached to the top surface of the inner wheel 8. Outer time wheel 6 has two surfaces, a top surface and a bottom surface, with the second end of connector 10 being centrally attached to the bottom surface of outer time wheel 6. Outer time wheel 6 is located on the outer casing 4.

The top surface of outer time wheel 6 has writing which allows an individual to set the regulator 2 to allow natural gas flow for one, two, or three hours at a time. The "1 hour" designation 20 is next to the "2 hour" designation 22, while the "3 hour" designation 24 is next to the "2 hour" designation. The top surface of outer wheel 6 also has knob 34, which is centrally located.

Attached to the bottom surface of outer time wheel 6 within regulator are four shut-off teeth 26, 28, 30, and 32. Shut-off tooth 26 is located immediately below the beginning of the "1 hour" designation 20. Shut-off tooth 28 is located immediately below the borderline between the end of the "1 hour" designation 20 and the beginning of the "2 hour" designation 22. Shut-off tooth 30 is located immediately below the borderline between the end of the "2 hour"

designation 22 and the beginning of the "3 hour" designation 24. Shut-off tooth 32 is located immediately below the end of the "3 hour" designation 24.

Grill line 36 is attached to the first side of outer casing 4, while incoming gas line 38 is attached to the second side of outer casing 4. Within outer casing, circular flap valve 40 is located over gas line 38.

FIG. 3A shows a rear view of the valve 40, while FIG. 3B shows a front view of the valve 40. Valve 40 is shaped like a cylindrical cross-section and is placed over the incoming gas line 38 that has two holes 42 and 44 opposite one another, and furthermore, valve 40 has four possible positions when placed over gas line 38. A "plus" network of ridges 76 creates four separate compartments, one of which is located over gas line 38 at any particular time.

Valve 40 is attached to the inside of the outer casing in such a manner so as to cover the incoming gas line in an off-center manner. When rotating around, one of the compartments will always cover over the incoming gas line 38.

Either hole 42 or hole 44 is located over the place where gas line 38 meets outer casing 4 (allowing natural gas to flow into the outer casing 4 of the regulator 2), or one of the spaces 46 or 48 is located over the place where gas line 38 meets outer casing 4 (preventing any natural gas from entering the outer casing 4 of regulator 2). Valve 40 has a plurality of notches 50 that are located on the perimeter of the valve 40, with each shut-off tooth poised to move valve 40 one-quarter turn by pushing forward on a notch 50. The rear side of valve 40 is mounted to the inside of the outer casing using mounting point 49. The notches 50 extend into the inside of the outer casing 4.

Looking back to FIGS. 1 and 2, because there are four "shut off teeth" that are used with the present invention, the regulator runs the risk of having either one or two of the three of the desired time frames working, but not all three of them working. For example, if the shut-off tooth 26 always acted to place valve 40 in a position that allows natural gas to flow through into outer casing 4, then shut-off tooth 28 always will act to place 40 in a position that allows natural gas to not flow through into outer casing 4, rendering the "1 hour" designation 20 of the present invention useful but the "2 hour" designation 22 completely useless (because shut-off tooth 28 always acts to turn off the natural gas flow at the beginning of the "two hour" period).

This problem is alleviated by having a fifth shut-off tooth 52 attached to bottom surface of the outer time wheel 6 in between shut-off tooth 26 and shut-off tooth 32. In this scenario, if a particular tooth acts to "shut off" the natural gas flow for a particular desired time cycle, an individual need only rotate outer time wheel 6 one complete turn, which will then cause that same tooth to act as a "turn on" mechanism for the natural gas flow for a particular desired time cycle.

A battery 78 provides power to the present invention. Battery 78 is likely accessible through a battery access panel door 80 located on the bottom of the outer casing 4, with battery 78 being located in a battery compartment 82. Battery 78 is electronically connected to the timer 12.

FIG. 4 shows a top view of the present invention in use. Knob 34 is used to rotate outer time wheel 6 until the appropriate shut-off tooth can be used to place valve 40 in a position where hole 42 or hole 44 is located over the junction between gas line 38 and the outer casing 4. This allows a volume of natural gas 60 from a natural gas source 62 to flow into the outer casing 4, through grill 36, and onto a grill 64 that is used to cook food.

The top side of outer casing 4 has an opening 66 that is normally covered with pivotal cover 68. Cover 68 can be rotated so that opening 66 is exposed. It is important to have opening 66 so that all excess natural gas within outer casing 4 can be released when the present invention is not in use.

What I claim as my invention is:

1. A natural gas regulating mechanism comprising:
   (a) an outer casing,
   (b) a central mount located within the outer casing,
   (c) an inner wheel centrally mounted on the central mount, the inner wheel having a top surface and a bottom surface, the inner wheel having a plurality of teeth,
   (d) a timer located within the outer casing, the timer designed to keep track of time on an ongoing basis,
   (e) a roller wheel attached to the timer, the roller wheel having a plurality of teeth and being vertically placed against the inner wheel, wherein the timer slowly rotates the roller wheel,
   (f) a connector having a first end and a second end, the first end of the connector being attached to the top surface of the inner wheel,
   (g) an outer time wheel having a top surface and a bottom surface, the bottom surface of the outer time wheel being connected to the second end of the connector, wherein the outer time wheel is located on the outer casing,
   (h) a knob attached to the top surface of the outer time wheel,
   (i) a plurality of shut-off teeth located on the bottom surface of the outer time wheel,
   (j) an incoming gas line attached to the outer casing,
   (k) an outgoing gas line attached to the outer casing,
   (l) a valve having a cylindrical cross-section, the valve axially attached to the inside of the outer casing so as to constantly cover the incoming gas line, the valve being divided into four separate sections, wherein two of the sections opposing one another have holes, further wherein the valve is attached to the outer casing in such a manner to cover the incoming gas line in an off-center manner, further wherein one of the sections will cover the incoming gas line at any particular time,
   (m) a plurality of notches attached to the valve, the plurality of notches extending into the outer casing,
   (n) power means for providing power to the timer,
   (o) wherein rotation of the outer time wheel causes the shut-off teeth to come into contact with the notches attached to the valve, wherein the valve is rotated into continual positions which alternatively cover and do not cover the flow of incoming gas into the outer casing.

2. A natural gas regulating mechanism according to claim 1 wherein the plurality of shut-off teeth is five shut-off teeth.

3. A natural gas regulating mechanism according to claim 2 wherein the plurality of notches attached to the valve is four notches.

4. A natural gas regulating mechanism according to claim 3 wherein the outer casing has a top-mounted opening, the opening being pivotally attached to the outer casing.

* * * * *